(12) United States Patent
Filali-Abid et al.

(10) Patent No.: US 8,250,352 B2
(45) Date of Patent: Aug. 21, 2012

(54) ISOLATING WORKLOAD PARTITION SPACE

(75) Inventors: Khalid Filali-Abid, Austin, TX (US); Perinkulam I Ganesh, Round Rock, TX (US); Paul David Mazzurana, Austin, TX (US); Edward Shvartsman, Austin, TX (US); Sungjin Yook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/620,873

(22) Filed: Nov. 18, 2009

(65) Prior Publication Data

US 2011/0119678 A1    May 19, 2011

(51) Int. Cl.
  G06F 9/00     (2006.01)
  G06F 15/167   (2006.01)
  G06F 15/177   (2006.01)
  G06F 12/00    (2006.01)
  G06F 9/445    (2006.01)
  G06F 9/46     (2006.01)
  G06F 3/00     (2006.01)

(52) U.S. Cl. ............ 713/1; 713/2; 709/215; 709/222; 711/129; 711/172; 718/1; 718/105; 719/324

(58) Field of Classification Search ............ 713/1, 2; 709/215, 222; 711/129, 172; 718/1, 105; 719/324

See application file for complete search history.

(56) References Cited

U.S. PATENT DOCUMENTS

| | | | |
|---|---|---|---|
| 7,020,758 B2 | 3/2006 | Fisk | |
| 7,032,107 B2* | 4/2006 | Stutton et al. | 713/2 |
| 7,058,764 B2 | 6/2006 | Bearden | |
| 7,284,109 B1* | 10/2007 | Paxie et al. | 711/173 |
| 7,443,878 B2 | 10/2008 | Hendel et al. | |
| 2003/0014585 A1* | 1/2003 | Ji | 711/112 |
| 2008/0155208 A1* | 6/2008 | Hiltgen et al. | 711/154 |
| 2009/0177756 A1 | 7/2009 | Gunda et al. | |
| 2009/0240904 A1* | 9/2009 | Austruy et al. | 711/162 |

OTHER PUBLICATIONS

Wujuan Lin-et al.; "WPAR: a weight-based metadata management strategy for petabyte-scale object storage systems"; INSPEC/IEEE; pp. 99-106; 2007.

Butler-et al.; "Rootkit-Resistant Disks"; ACM Digital Library; pp. 403-412; Oct. 2008.

Nightingale-et al.; "Speculative Execution in a Distributed File System"; ACM Digital Library; pp. 191-201; Oct. 2005.

(Continued)

*Primary Examiner* — Stefan Stoynov
(74) *Attorney, Agent, or Firm* — Garg Law Firm, PLLC; Rakesh Garg; Libby Z. Toub

(57) ABSTRACT

A method, system, and computer usable program product for isolating a workload partition space are provided in the illustrative embodiments. A boot process of a workload partition in a data processing system is started using a scratch file system, the scratch file system being in a global space. A portion of a storage device containing a file system for the workload partition is exported to the workload partition, the portion forming an exported disk. The partially booted up workload partition may discover the exported disk. The exporting causes an association between the global space and the exported disk to either not form, or sever. The exporting places the exported disk in a workload partition space associated with the workload partition. The boot process is transitioned to stop using the scratch file system and start using the data in the exported disk for continuing the boot process.

25 Claims, 5 Drawing Sheets

OTHER PUBLICATIONS

Lu-et al.; "Workload Decomposition for QoS in Hosted Storage Services"; ACM Digital Library: pp. 19-29; Dec. 2008.

Andrade-et al.; "Efficient Execution of Multiple Query Workloads in Data Analysis Applications"; ACM Digital Library; pp. 1-10; Nov. 2001.

Solter et al; "Open Solaris, Bible", XP-002632929, Wiley Publishing, Inc; Feb. 12, 2009, 693-740, Frontpage, Bibliographic Data Indianapolis, Indiana, USA.

European Patent Office, International Search Report, EP2010/066902, May 3, 2011, UK.

* cited by examiner

EXPORTED DATA ON THE DEVICE, OTHER DEVICES MOUNTED BY WPAR

ISOLATING WORKLOAD PARTITION SPACE

RELATED APPLICATION

The present invention is related to similar subject matter of co-pending and commonly assigned U.S. patent application Ser. No. 12/581,866 entitled "SYSTEM FOR IMPROVING A USER-SPACE," filed on Oct. 19, 2009, which is hereby incorporated by reference.

BACKGROUND OF THE INVENTION

1. Field of the Invention

The present invention relates generally to an improved data processing system, and in particular, to a computer implemented method for operating partitions in a data processing environment. Still more particularly, the present invention relates to a computer implemented method, system, and computer usable program code for isolating workload partition space.

2. Description of the Related Art

Workload partition is a technology that allows separating users and applications by employing software techniques instead of forming separate hardware partitions. In other words, a data processing system can be so configured as to allow one or more virtual partitions to operate within the data processing system's operating system. Such a virtual partition is called a workload partition, or WPAR.

A WPAR shares the operating system and resources of the host data processing system. Resources accessible to the operating system of the host data processing system are said to belong to a "global space". Conversely, a resource in the global space can be accessed by the operating system of the host data processing system.

An application executing in a WPAR may use the WPAR as if the WPAR were a complete data processing system. The application executes in the WPAR without the awareness that the WPAR, and consequently the application, is sharing resources in the global space of the host data processing system. More than one WPAR may share resources in the global space.

A WPAR is configured, started, operated, and eventually terminated in a host data processing system using resources in the global space. Resources utilized by the WPAR during these various stages remain visible, available, and accessible to the operating system of the host data processing system.

WPARs are commonly employed for separating applications, functions, or functionalities from one another. The separation may be desirable for a variety of reasons, such as security, performance, portability, or administrative concerns.

For example, a desirable feature of a banking application may be to separate the back-office functions from the web-user functions. Such a separation may be achieved by implementing the back-office functions and the web-user functions in a manner that they can be executed on different WPARs.

SUMMARY OF THE INVENTION

The illustrative embodiments provide a method, system, and computer usable program product for isolating a workload partition space. According to the invention, an embodiment starts a boot process of a workload partition in a data processing system using a scratch file system, the scratch file system being in a global space and accessible to an operating system of the data processing system. The embodiment exports from the global space to the workload partition, a portion of a storage device containing a file system for the workload partition, the portion forming an exported disk, the exporting causing an association between the global space and the exported disk to sever and placing the exported disk in a workload partition space associated with the workload partition. The embodiment transitions the boot process, the transitioning causing the boot process to stop using the scratch file system and start using the exported disk. The embodiment continues the boot process using the exported disk, wherein the boot process continues using data in the exported disk.

In another embodiment the operating system does not have access to the data in the exported disk while the exported disk is located in the workload partition space.

Another embodiment further specifies the portion as containing the file system for the workload partition.

The embodiment populates the portion with the file system for the workload partition.

Another embodiment further mounts the exported disk at the workload partition, the mounting making the exported disk accessible to the workload partition.

Another embodiment further mounts a second volume at the workload partition, the mounting causing the second volume to be placed in the workload partition space.

Another embodiment further creates the scratch file system, the scratch file system containing only that data which is usable for bringing the boot process of the workload partition to a point where the transitioning can occur.

Another embodiment further shares a part of data in the workload partition space with a second workload partition space, the global space, a second global space, or a combination thereof.

Another embodiment further terminates the workload partition. The embodiment merges the workload partition space into the global space, the merging causing the data in the workload partition space to become accessible to the operating system.

In another embodiment the starting the boot process of the workload partition includes creating a workload partition context for the workload partition, associating the scratch file system with the workload partition context, or a combination thereof.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
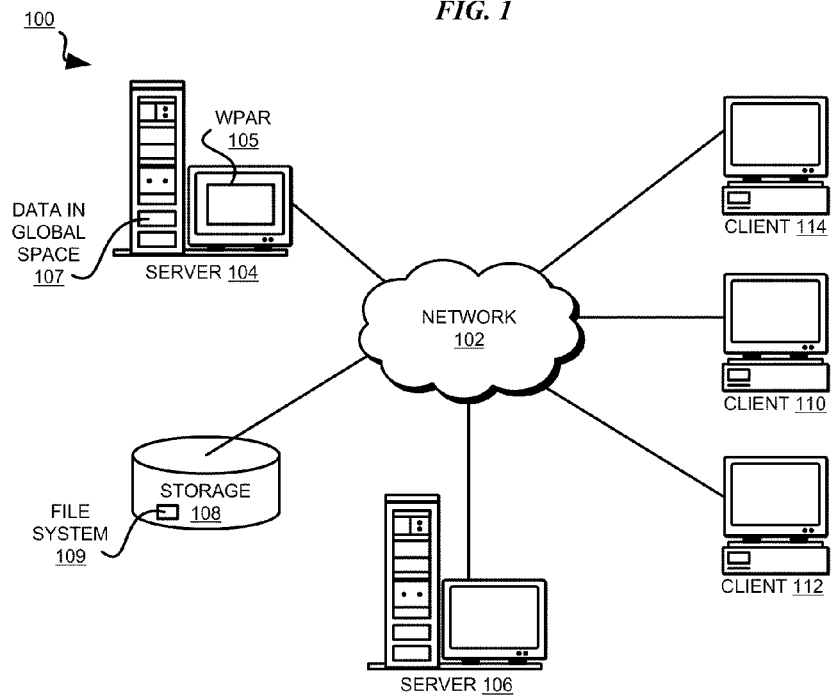
FIG. 1 depicts a pictorial representation of a network of data processing systems in which illustrative embodiments may be implemented.

Resources available in the global space may include any type of hardware, software, firmware, or data resource. A file system is also a resource that can be included in the global space. A file system is an organization of data in a manner usable by certain types of data processing systems. For example, a file system may be a hierarchical organization of data files that is known to a certain application. As an example, a root file system is a default directory structure of files usable for booting a certain operating system.

The invention recognizes that the present method of operating WPARs shares a WPAR's file system with the host operating system. Presently, the host operating system loads all information needed to bring a WPAR into existence into a file system in a storage device in the global space. The start command for starting a WPAR creates a WPAR context and shares this file system with the newly created WPAR context. The WPAR uses the data in the preloaded file system to initialize and go into operation. In this general manner, the host operating system maintains visibility and access to the file system used by the WPAR.

The invention recognizes that an objective of using WPARs is to prevent the execution or failure of an application under one WPAR from affecting the execution of another application under a different WPAR or the host operating system. The invention recognizes that in the present method of operating WPARs, a WPAR's file system is not isolated from the host operating system. Consequently, the invention recognizes that the execution of an application under a present WPAR can influence the operation of other applications under the host operating system, and vice versa.

Furthermore, the invention recognizes that the WPAR's file system remaining in the global space poses security threats to the data stored therein. For example, an application executing under a present WPAR may have adequately addressed the security of certain data under the control of the WPAR. However, the data, residing in a file system in the global space, may remain vulnerable to misuse by another part of the host data processing system that can access the WPAR's file system in the global space.

The illustrative embodiments used to describe the invention generally address and solve the above-described problems and other problems related to WPARs. The illustrative embodiments provide a method, computer usable program product, and data processing system for isolating a workload partition space (WPAR space).

A WPAR space is the collection of resources that is accessible to a WPAR. Presently, a WPAR space is a subset of a global space, the resources in the WPAR space being accessible to a WPAR as well as the host operating system.

According to the invention, in one embodiment, a WPAR space may provide access to the resources therein exclusively to a WPAR. In another embodiment according to the invention, a WPAR space may provide exclusive access to some resources in the WPAR space to a WPAR, and a shared access to other resources in the WPAR space to the WPAR and the host operating system.

The illustrative embodiments are described with respect to certain data, data structures, file systems, fine names, directories, and paths only as examples. Such descriptions are not intended to be limiting on the invention. For example, an illustrative embodiment described with respect to root volume group (rootvg) file system may be implemented with respect to another disk, volume, volume group, or file system in a similar manner within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, or a combination thereof.

Application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which the invention may be implemented. (Java, EJB, and other Java related terminologies are registered trademarks of Sun Microsystems, Inc. in the United States and other countries.)

An illustrative embodiment may be implemented in hardware, software, or a combination thereof. An illustrative embodiment may further be implemented with respect to any type of resource that may be available in a given global space. For example, a hardware or firmware component of a data processing system may be a resource capable of being placed in a global space. Such hardware or firmware components are also resources within the scope of the invention and the invention can be practiced with respect to such resources as well.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
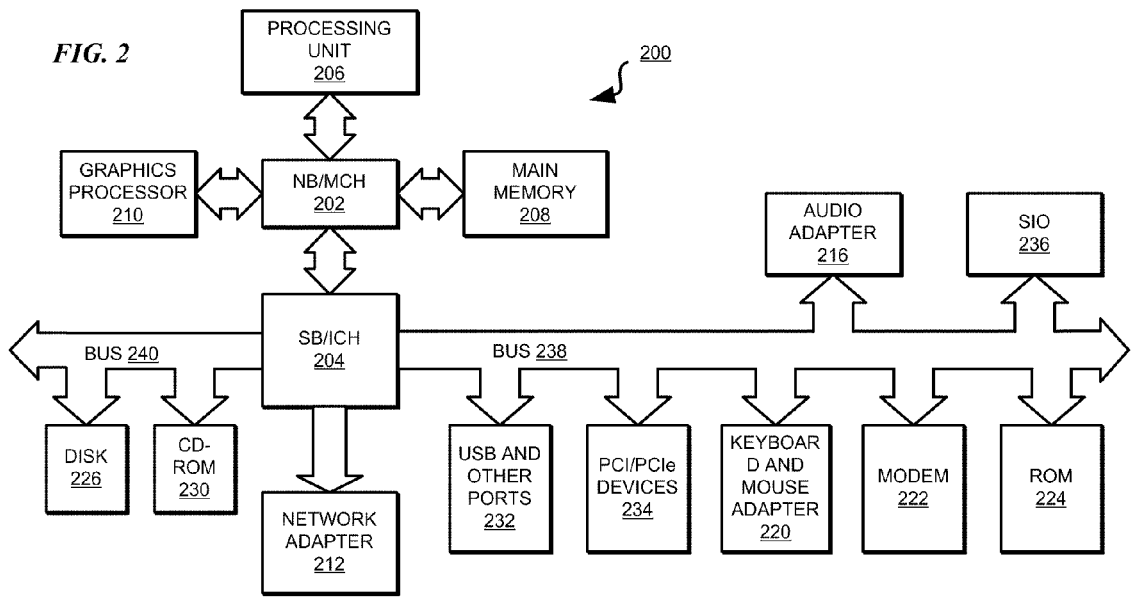
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include WPAR 105. WPAR 105 may be a workload partition of any kind. Server 104 may further include data 107. Data 107 may be data in a global space such that data 107 is accessible to the operating system of server 104 as well as WPAR 105. Storage 108 may also include one or more data files usable by WPAR 105. File system 109 may be an example organization of such data. File system 109 may also be a part of data 107 in global space.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of Page of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
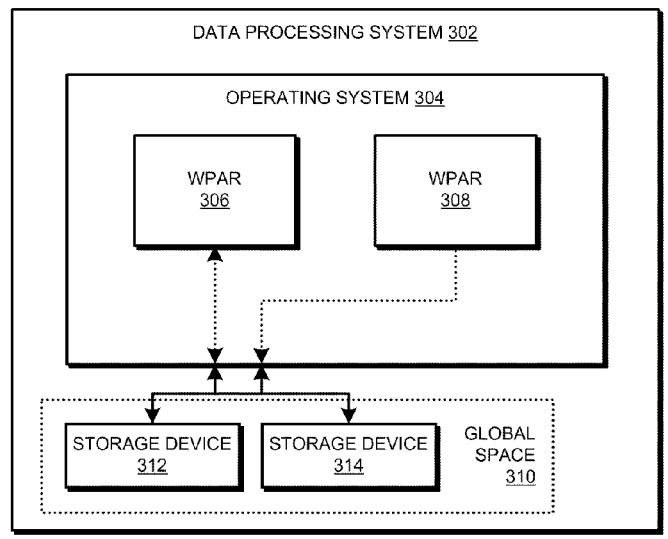
FIG. 3 depicts a block diagram of a WPAR space configuration with respect to which an illustrative embodiment may be implemented.

With reference to FIG. 3, this figure depicts a block diagram of a WPAR space configuration with respect to which an illustrative embodiment may be implemented. Data processing system 302 may be any type of data processing system capable of executing a WPAR therein. For example, data processing system 302 may be a server data processing system, such as server 104 in FIG. 1.

Operating system 304 may be responsible for operating data processing system 302. Operating system 304 may be a host operating system in that one or more WPARs may be configurable and operable within the scope of operating system 304. WPARs 306 and 308 are example WPARs operating within operating system 304. Any number of WPARs may be operated within operating system 304 in the manner of WPARs 306 and 308.

Global space 310 may include any type and number of resources accessible to operating system 304. As an example, global space 310 may include storage devices 312 and 314. Storage device 312, 314, or both 312 and 314, may include data that is usable by WPAR 306, WPAR 308, or both WPARs 306 and 308.

Presently, as an example, any data on storage device 312 that is usable by WPAR 306 is in the WPAR space of WPAR 306, but also in global space 310. Accordingly, presently, a WPAR space of WPAR 306 on storage device 312 is a subset of global space 310. Consequently, disadvantageously, data in such a WPAR space is accessible to both WPAR 306 as well as operating system 304.

Figure 4:
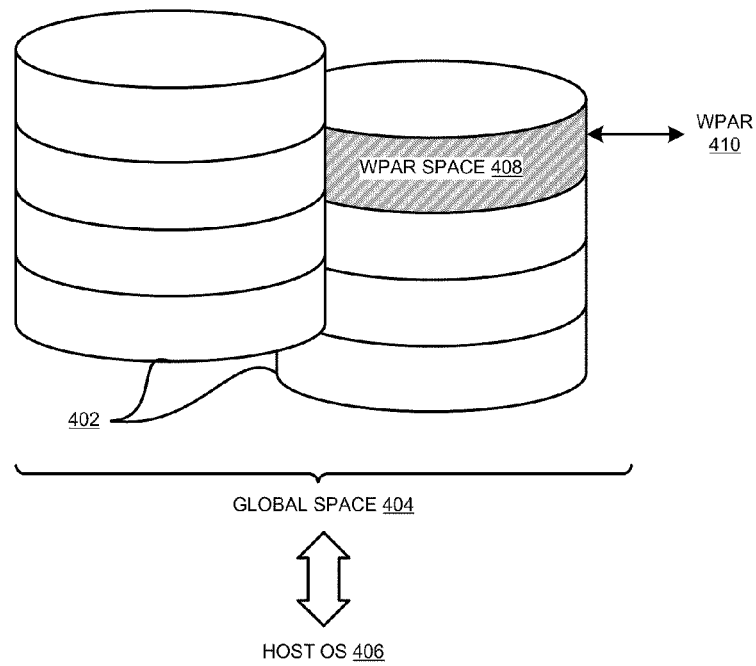
FIG. 4 depicts a block diagram of a configuration of WPAR space with respect to which an illustrative embodiment may be implemented.

With reference to FIG. 4, this figure depicts a block diagram of a configuration of WPAR space with respect to which an illustrative embodiment may be implemented.

Storage device 402 may be any type of data storage device, such as storage 108 in FIG. 1.

Storage device 402 may be capable of being placed in a global space, such as storage device 312 in global space 310 in FIG. 3. FIG. 4 depicts storage device 402 as being a part of global space 404, which is accessible by host operating system 406. Host operating system 406 may be implemented using operating system 304 in FIG. 3.

Furthermore, storage device 402 may include any number of separately configurable data storage media, such as hard disks. In one example present configuration, disk 408 may be configured to include data for configuring and operating WPAR 410. Accordingly, disk 408 may include a WPAR space for use by WPAR 410. As depicted in this figure, the WPAR space on disk 408 is also presently accessible by host operating system 406.

Figure 5:
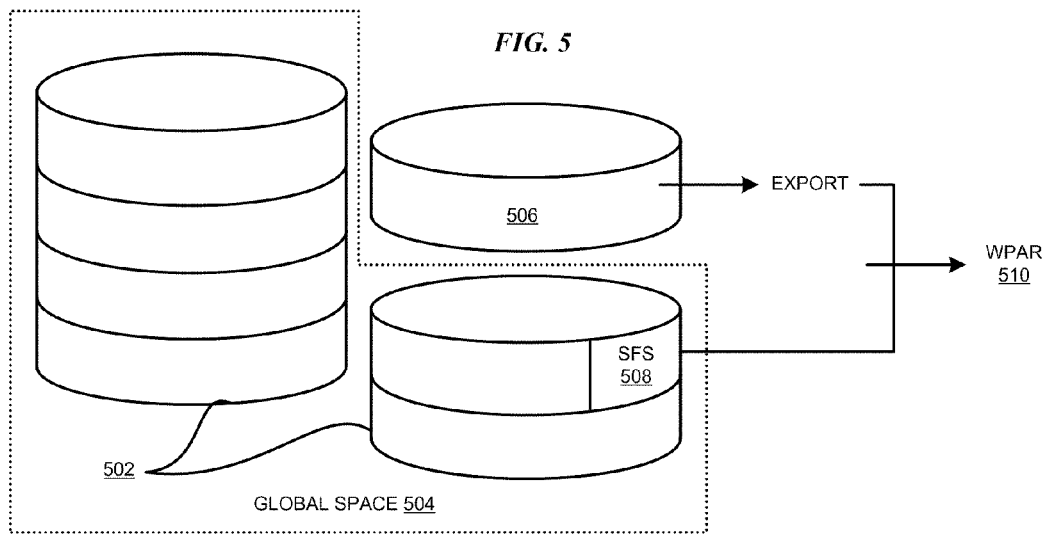
FIG. 5 depicts a block diagram of a configuration of a WPAR space in accordance with an illustrative embodiment.

With reference to FIG. 5, this figure depicts a block diagram of a configuration of a WPAR space in accordance with an illustrative embodiment. Storage device 502 may be implemented using storage device 402 in FIG. 4.

In accordance with an illustrative embodiment, a portion of a storage device may be exportable from a global space. Disk 506 may be an example of such a portion. As an example, prior to using in an illustrative embodiment, disk 506 may be configured to be a part of storage device 502. When used in the illustrative embodiment, disk 506 may be exported from the storage device leaving only storage device 502 as depicted in global space 504.

Disk 506 may include data that may be a part of a WPAR space. When disk 506 is exported from global space 504, any association of file systems on disk 506 are severed from global space 504. In other words, global space 504 loses the visibility and accessibility to data on exported disk 506. Thus, upon export, data on disk 506 that is in a WPAR space becomes isolated from global space 504 and the host operating system can no longer access that data.

Storage device 502 remaining in global space 504 may include file system 508. File system 508 may be file system usable for configuring and beginning the boot process of WPAR 510. Because the data in file system 508 has to be usable with WPAR 510, file system 508 may be in the WPAR space of WPAR 510. Being on storage device 502, file system 508 is also a part of global space 504 and also accessible to the host operating system of WPAR 510.

According to an illustrative embodiment, file system 508 may not include all the data usable for configuring, booting, and operating WPAR 510, but just that data that can progress the configuration and boot process of WPAR 510 to a predetermined stage. The remaining data to progress the boot process and configuration of WPAR 510 further may be stored on disk 506, which may be exported to WPAR 510.

The operation of an embodiment of the invention is described using a rootvg WPAR as an example without limiting the scope of the invention. A rootvg WPAR is a type of WPAR where the root volume group (rootvg) is contained in the one or more disks exported to the WPAR. A rootvg is a logical volume of a storage device where root files of an operating system or WPAR are stored. Root files include data that is usable for booting up, configuring, and operating the operating system or WPAR.

The rootvg may span any number, type, or combination of disks or other data storage media.

Furthermore, the rootvg may be situated locally within the data processing system where the WPAR may be executing or be accessible to WPAR over a data network, such as from a network attached storage (NAS).

Using a rootvg WPAR as an example, the rootvg data can be spread across disk 506 and file system 508. For example, disk 506 may include all or most of the rootvg, whereas file system 508 may include only those files from rootvg that can begin the boot process of WPAR 510 and configure WPAR 510 up to a predetermined point in the boot process. In one embodiment, file system 508 may be scratch file system (SFS) in that SFS 508 is used only for a period of time and for a specific purpose, to wit, start the boot process and configure WPAR 510 to a certain point, and then no longer used by WPAR 510.

Figure 6:
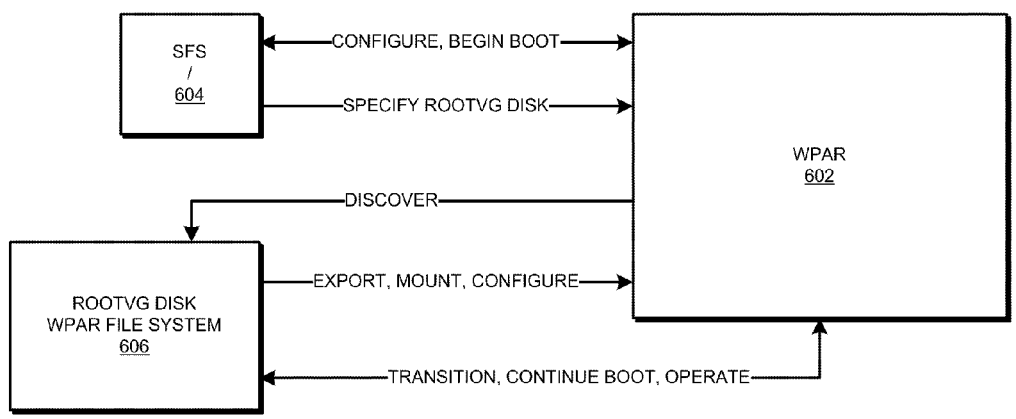
FIG. 6 depicts a block diagram of progression of the boot process in an example type of WPAR for isolating the WPAR space in accordance with an illustrative embodiment.

With reference to FIG. 6, this figure depicts a block diagram of progression of the boot process in an example type of WPAR for isolating the WPAR space in accordance with an illustrative embodiment. WPAR 602 may be implemented using WPAR 510 in FIG. 5. For the clarity of the description of the illustrative embodiment, only as an example, WPAR 602 may be a rootvg WPAR.

Figure 8:
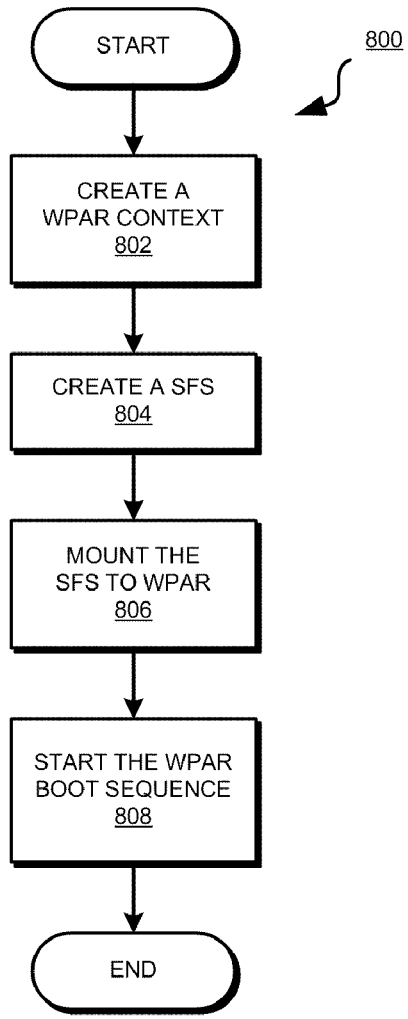
FIG. 8 depicts a flow chart of a process of booting up a WPAR in accordance with an illustrative embodiment.

SFS 604 may be a scratch file system, such as file system 508 in FIG. 8. Rootvg disk 606 may be all or a portion of a storage device where all or most of WPAR file system for WPAR 602 may be stored. For example, in one embodiment, core boot-up files for WPAR 602 may be stored in SFS 604 and the remainder files for WPAR file system may be stored in disk 606, labeled "rootvg disk". Rootvg disk 606 may be local to the data processing system where WPAR 602 may be executing, or may be accessible over a data network.

Continuing the description of the operation of an embodiment of the invention using rootvg WPAR example, SFS 604 and rootvg disk 606 may be in the WPAR space of WPAR 602. A component of a host operating system begins the boot process of WPAR 602 using data on SFS 604. Data on SFS 604 may also be usable to configure certain aspects of WPAR 602, such as specifying the identity and location of rootvg disk 606.

In one embodiment, rootvg disk 606 may not be populated with the WPAR file system up to this point in the boot-up process. In an embodiment, populating rootvg disk 606 with WPAR file system may be a part of the configuration using SFS 604.

The host operating system or a mechanism thereof is generally responsible for creating a WPAR and a corresponding WPAR context. Such a mechanism is configured to export rootvg disk 606 from the global space. The export process causes exported disk 606 to be associated with the WPAR context of WPAR 602. In one embodiment, the timing of the export may be a part of, and configurable using, the data of SFS 604.

Exported disk 606 is mounted, or made accessible, to WPAR 602. In one embodiment, the mounting of rootvg disk 606 may be a part of, and configurable using, the data of SFS 604. The exporting and mounting of disk 606 may include other implementation-specific steps. Such steps are not described here, but may be implemented using SFS 604 and disk 606 in the manner described. Such steps are contemplated within the scope of the invention.

In one embodiment, these operations bring the boot-up process of WPAR 602 to a point where the boot-up process can stop depending on SFS 604 and continue using the data on disk 606. WPAR 602 continues the boot-up process by using the WPAR file system on disk 606 and stops using the data on SFS 604.

Eventually, WPAR 602 completes the boot-up process and begins the intended operations. Through the process described above, WPAR 602 uses SFS 604, which remains shared in the global space, only to reach a certain point in the boot-up process. For further operations upon reaching that point, WPAR 602 only depends on disk 606 or any new disks or file system that WPAR 602 mounts.

In one embodiment, WPAR 602 may choose to mount a file system that is not in the global space, thereby maintaining a complete isolation of WPAR 602's file system from the global space. In another embodiment, WPAR 602 may choose to mount a combination of file systems, some of which may be shared with the global space. In such an embodiment, the WPAR space of WPAR 602 may be partially isolated and partially shared with the global space.

In another embodiment, WPAR 602 may mount a file system from another global space of another data processing system. In another embodiment, WPAR 602 may mount a file system from a network attached storage device such that the file system may or may not be a part of a global space.

In another embodiment, WPAR 602 may mount a file system in WPAR 602's WPAR space that is not shared with the global space, but shared with the WPAR space of another WPAR. An embodiment may mount any combination of file systems, shared with any other global or WPAR space, or in isolation there from, within the scope of the invention.

The descriptions of FIGS. 5 and 6, and the descriptions of the various illustrative embodiments generally, describe a particular way of associating the exported disk and the file system thereon with a WPAR only as an example. For example, one way to associate WPAR 602 with exported disk 606 in FIG. 6 is to include a reference to exported disk 606 in the SFS 604. In other words, WPAR 602 is told about the existence of exported disk 606.

Other ways of associating WPAR 602 with exported disk 606 are contemplated within the scope of the invention. As one example, using SFS 604, WPAR 602 may reach a point in the boot-up process that WPAR 602 may be able to discover exported disk 606 on its own. For example, upon booting to a certain point in the boot-up process using SFS 604, WPAR 602 may become aware of the various data sources available to WPAR 602 via the host data processing system or the data networks to which the host data processing system has access.

WPAR may then be able to search for a file system with certain characteristics. A characteristic of a file system may be any parameter associated with and descriptive of an aspect of a file system in a given data processing environment. WPAR 602 may locate a disk or any type of installation medium over a data network as containing the desired file system. WPAR 602 may mount the located disk in the manner of exported disk 606.

In one embodiment, the discovered disk or any type of installation media may not be accessible or known to the global space of the host data processing system of WPAR 602. Furthermore, the global space of the host data processing system may or may not have populated the file system of the discovered disk.

Thus, exported disk 606 may be out of the awareness of the global space, may be populated by some source other than the global space of the host data processing system, and may be exported from or by a source other than the global space of the host data processing system. Furthermore, the export of exported disk 606 may occur from another source or space to WPAR 602 without exporting to the global space of the host data processing system of WPAR 602.

This and other combinations and variations of discovering, populating, exporting, and mounting disks with one or more file systems desired by WPAR 602 will be apparent from this disclosure. Such combinations and variations are contemplated within the scope of the invention.

Figure 7:
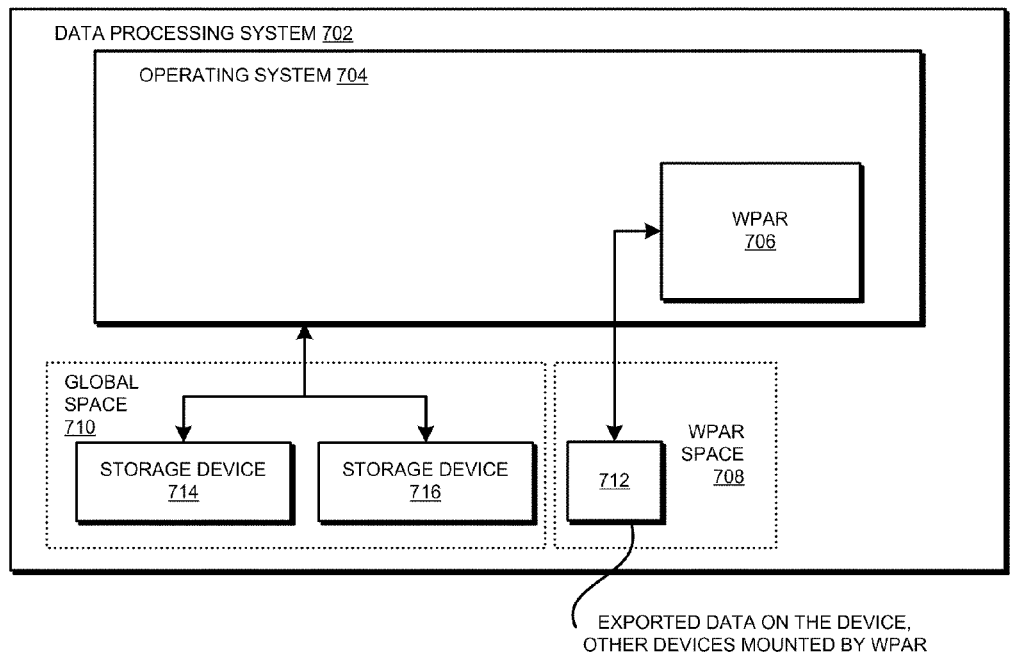
FIG. 7 depicts a block diagram of an isolated WPAR space in accordance with an illustrative embodiment.

With reference to FIG. 7, this figure depicts a block diagram of an isolated WPAR space in accordance with an illustrative embodiment. Data processing system 702 may be similar to data processing system 302 in FIG. 3. Operating system 704 may be similar to operating system 304 in FIG. 3. WPAR 706 may be similar to WPAR 306 in FIG. 3.

Following the operations described in FIGS. 5 and 6, WPAR 706 becomes operational in data processing system 702. WPAR 706 has access to WPAR space 708. Operating system 704 has no visibility or access to WPAR space 708. Global space 710 remains accessible to operating system 704. In one embodiment, WPAR 706 may also access data in global space 710.

WPAR space 708 includes file system 712. File system 712 includes data, files, and file systems on the disk that is exported to WPAR space 708 from global space 710. File system 712 may further include other data, files, and file systems contained on other disk or storage devices that WPAR 706 mounts. Storage device 714 and 716 may store data that belongs to global space 710.

In the example depiction of FIG. 7, WPAR space 708 of WPAR 706 is shown completely isolated from global space 710. In other words, the depiction of FIG. 7 shows only as an example that no data in WPAR space 708 is accessible to operating system 704.

Of course, WPAR space 608 and global space 610 may overlap within the scope of the invention in an embodiment. In such an embodiment, the data lying in the non overlapping region of WPAR space 708 will not be accessible to operating system 704. The data lying in the overlapped region of WPAR space 708 and global space 710 may be accessible to WPAR 706 as well as operating system 704.

With reference to FIG. 8, this figure depicts a flow chart of a process of booting up a WPAR in accordance with an illustrative embodiment. Process 800 may be implemented in a component or mechanism of a host operating system, such as operating system 704 in FIG. 7, that is responsible for creating, operating, and managing WPARs.

Process 800 begins by creating a WPAR context for a WPAR, such as WPAR 706 in FIG. 7, (step 802). Process 800 creates a file system, such as SFS 604 in FIG. 6, that can be used to begin the boot-up process of the WPAR (step 804).

Process 800 mounts the file system created in step 804 to the WPAR (step 806). Process 800 begins the boot sequence for the WPAR using the data from the file system created in step 804 (step 808). Process 800 ends thereafter.

Figure 9:
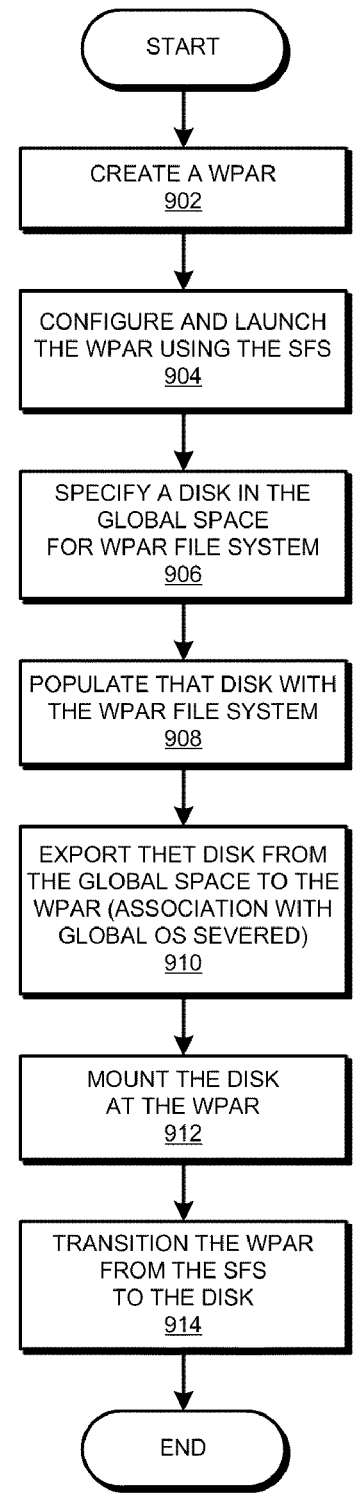
FIG. 9 depicts a flowchart of a process of isolating a WPAR space in accordance with an illustrative embodiment.

In one embodiment, process 800 may be implemented as step 902 in process 900 in FIG. 9. In such an embodiment, process 800 may not terminate but proceed to step 904 in FIG. 9.

With reference to FIG. 9, this figure depicts a flowchart of a process of isolating a WPAR space in accordance with an illustrative embodiment. Process 900 may be implemented in a component or mechanism of a host operating system, such as operating system 704 in FIG. 7, that is responsible for creating, operating, and managing WPARs.

Process 900 begins by creating a WPAR (step 902). Step 902 may be implemented using process 800 in FIG. 8. Process 900 configures and launches the WPAR using the data in a SFS, such as the SFS created in step 804 in process 800 in FIG. 8, (step 904).

Process 900 specifies a disk in the global space that contains a WPAR file system (step 906). In one embodiment, the disk specified in step 906 may not yet include the WPAR file system. In such an embodiment, process 900 populates the WPAR file system on the disk (step 908).

Process 900 exports the disk from the global space to the WPAR space (step 910). As an effect of exporting the disk, process 900 severs the associations between the global space and the disk.

Process 900 mounts the exported disk to the WPAR (step 912). Process 900 transitions the WPAR from the SFS to the disk mounted in step 912 (step 914). Process 900 ends thereafter.

Figure 10:
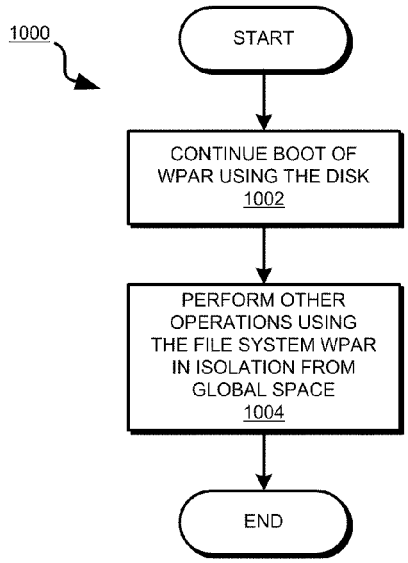
FIG. 10 depicts a process of operating a WPAR in isolation from the global space in accordance with an illustrative embodiment.

With reference to FIG. 10, this figure depicts a process of operating a WPAR in isolation from the global space in accordance with an illustrative embodiment. In one embodiment, process 1000 may be implemented in a component or mechanism of a host operating system, such as operating system 704 in FIG. 7, that is responsible for creating, operating, and managing WPARs. In another embodiment, process 1000 may be implemented in the code for WPAR itself, such as in the code for WPAR 602 in FIG. 6. In another embodiment, process 1000 may be implemented in a combination of the component or mechanism of the host operating system or the code of the WPAR.

Process 1000 begins by continuing the WPAR's boot-up process from where process 900 leaves off (step 1002). Step 1002 uses the data on the disk to which the WPAR transitions in step 914 in FIG. 9.

Process 1000 performs other operations using the WPAR file system on the disk used in step 1002 (step 1004). Process 1000 ends thereafter. Process 1000 performs these other operations in isolation from the host operating system and the global space. Some examples of the other operations that may be performed in step 1004 include—initialization of various WPAR components, and mounting other disks, volumes, volume groups, or file systems.

At any point during the operation of a WPAR in the manner of an embodiment of the invention, such as in step 1004 in FIG. 10, the WPAR may terminate the isolation from the global space, or share a part of the WPAR space with the global space. The WPAR may also share the WPAR's space with another WPAR, or share data from another WPAR's space. During operation, the WPAR may merge, share, terminate, sever, join, allow access, gain access, isolate, or otherwise manipulate data across own WPAR space, another WPAR's space, and global space in any combination within the scope of the invention.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for isolating a workload partition space from the global space. Using the embodiments of the invention, a WPAR can initiate boot-up using shared data from the global space, and then transition to an isolated file system to continue.

Using an embodiment of the invention, a WPAR's space can be completely or partially isolated from a global space as desired in a particular implementation. The data in the isolated portion of a WPAR's space is not accessible to the host operating system.

Using an embodiment of the invention, several WPAR spaces can be isolated from one another and from the host operating system to improve overall reliability and performance of the host data processing system. According to the invention, data in the isolated WPAR space can be manipulated, or even suffer corruption, without affecting the operation of other WPARs or the host operating system. For example, a crash of the web-user interface application of a banking application operating under a WPAR need not cause disruption of the back-office function operating under a different WPAR, by virtue of the WPAR space isolation afforded by the invention.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for isolating a workload partition space, the computer implemented method comprising:
   starting, using a processor and a memory, a boot process of a workload partition in a data processing system using a scratch file system, the scratch file system being in a global space and accessible to an operating system of the data processing system;
   exporting from the global space to the workload partition, a portion of a storage device containing a file system for the workload partition, the portion forming an exported disk, the exporting causing an association between the global space and the exported disk to sever and placing the exported disk in a workload partition space associated with the workload partition;
   transitioning the boot process, the transitioning causing the boot process to stop using the scratch file system and start using the exported disk; and
   continuing the boot process using the exported disk, wherein the boot process continues using data in the exported disk.

2. The computer implemented method of claim 1, wherein the operating system does not have access to the data in the exported disk while the exported disk is located in the workload partition space.

3. The computer implemented method of claim 1, further comprising:
   specifying the portion as containing the file system for the workload partition; and
   populating the portion with the file system for the workload partition.

4. The computer implemented method of claim 1, further comprising:
   mounting the exported disk at the workload partition, the mounting making the exported disk accessible to the workload partition.

5. The computer implemented method of claim 1, further comprising:
   mounting a second volume at the workload partition, the mounting causing the second volume to be placed in the workload partition space.

6. The computer implemented method of claim 1, further comprising:
   creating the scratch file system, the scratch file system containing only that data which is usable for bringing the boot process of the workload partition to a point where the transitioning can occur.

7. The computer implemented method of claim 1, further comprising:
   sharing a part of data in the workload partition space with one of (i) a second workload partition space, (ii) the global space, and (iii) a second global space.

8. The computer implemented method of claim 1, further comprising:
   terminating the workload partition; and
   merging the workload partition space into the global space, the merging causing the data in the workload partition space to become accessible to the operating system.

9. The computer implemented method of claim 1, wherein the starting the boot process of the workload partition includes (i) creating a workload partition context for the workload partition and (ii) associating the scratch file system with the workload partition context.

10. A computer implemented method for isolating a workload partition space, the computer implemented method comprising:

starting, using a processor and a memory, a boot process of a workload partition in a data processing system using a scratch file system, the scratch file system being in a global space and accessible to an operating system of the data processing system;

discovering using the workload partition, a portion of a storage device containing a file system for the workload partition;

exporting to the workload partition, the portion of the storage device, the portion forming an exported disk, and placing the exported disk in a workload partition space associated with the workload partition;

transitioning the boot process, the transitioning causing the boot process to stop using the scratch file system and start using the exported disk; and continuing the boot process using the exported disk, wherein the boot process continues using data in the exported disk.

11. The computer implemented method of claim 10, wherein the global space does not have access to the data in the exported disk before exporting, and wherein the exporting is performed without allowing the global space access to the data in the exported disk.

12. The computer implemented method of claim 10, further comprising:

mounting the exported disk at the workload partition, the mounting making the exported disk accessible to the workload partition.

13. A computer usable program product comprising a computer usable storage device including computer usable code for isolating a workload partition space, the computer usable code comprising:

computer usable code for starting a boot process of a workload partition in a data processing system using a scratch file system, the scratch file system being in a global space and accessible to an operating system of the data processing system;

computer usable code for exporting from the global space to the workload partition, a portion of a storage device containing a file system for the workload partition, the portion forming an exported disk, the exporting causing an association between the global space and the exported disk to sever and placing the exported disk in a workload partition space associated with the workload partition;

computer usable code for transitioning the boot process, the transitioning causing the boot process to stop using the scratch file system and start using the exported disk; and computer usable code for continuing the boot process using the exported disk, wherein the boot process continues using data in the exported disk.

14. The computer usable program product of claim 13, wherein the operating system does not have access to the data in the exported disk while the exported disk is located in the workload partition space.

15. The computer usable program product of claim 13, further comprising:

computer usable code for specifying the portion as containing the file system for the workload partition; and computer usable code for populating the portion with the file system for the workload partition.

16. The computer usable program product of claim 13, further comprising:

computer usable code for mounting the exported disk at the workload partition, the mounting making the exported disk accessible to the workload partition.

17. The computer usable program product of claim 13, further comprising:

computer usable code for mounting a second volume at the workload partition, the mounting causing the second volume to be placed in the workload partition space.

18. The computer usable program product of claim 13, further comprising:

computer usable code for creating the scratch file system, the scratch file system containing only that data which is usable for bringing the boot process of the workload partition to a point where the transitioning can occur.

19. The computer usable program product of claim 13, further comprising:

computer usable code for sharing a part of data in the workload partition space with one of (i) a second workload partition space, (ii) the global space, and (iii) a second global space.

20. The computer usable program product of claim 13, wherein the computer usable code for starting the boot process of the workload partition includes (i) computer usable code for creating a workload partition context for the workload partition and (ii) computer usable code for associating the scratch file system with the workload partition context.

21. The computer usable program product of claim 13, wherein the computer usable code is stored in a computer readable storage medium in a data processing system, and wherein the computer usable code is transferred over a network from a remote data processing system.

22. The computer usable program product of claim 13, wherein the computer usable code is stored in a computer readable storage medium in a server data processing system, and wherein the computer usable code is downloaded over a network to a remote data processing system for use in a computer readable storage medium associated with the remote data processing system.

23. A data processing system for isolating a workload partition space, the data processing system comprising:

a storage device including a storage medium, wherein the storage device stores computer usable program code; and a processor, wherein the processor executes the computer usable program code, and wherein the computer usable program code comprises:

computer usable code for starting a boot process of a workload partition in a data processing system using a scratch file system, the scratch file system being in a global space and accessible to an operating system of the data processing system;

computer usable code for discovering using the workload partition, a portion of a storage device containing a file system for the workload partition;

computer usable code for exporting to the workload partition, the portion of the storage device, the portion forming an exported disk, and placing the exported disk in a workload partition space associated with the workload partition;

computer usable code for transitioning the boot process, the transitioning causing the boot process to stop using the scratch file system and start using the exported disk; and computer usable code for continuing the boot process using the exported disk, wherein the boot process continues using data in the exported disk.

24. The data processing system of claim 23, wherein the global space does not have access to the data in the exported disk before exporting, and wherein the exporting is performed without allowing the global space access to the data in the exported disk.

25. The data processing system of claim 23, further comprising:

computer usable code for mounting the exported disk at the workload partition, the mounting making the exported disk accessible to the workload partition.

* * * * *